Dec. 3, 1940.                H. HUGEL                2,223,786

BOREHOLE PRESSURE GAUGE

Filed Jan. 13, 1938

Inventor: Helmut Hügel
By his Attorney

Patented Dec. 3, 1940

2,223,786

UNITED STATES PATENT OFFICE 2,223,786

BOREHOLE PRESSURE GAUGE

Helmut Hügel, Campina, Rumania, assignor to Shell Development Company, San Francisco, Calif., a corporation of Delaware Application January 13, 1938, Serial No. 184,780
In Rumania January 21, 1937

6 Claims. (Cl. 234—20)

This invention pertains to pressure gauges, and relates more specifically to a piston type pressure gauge for oil wells adapted to be lowered into a borehole on a wire line or string of tubing and to register automatically the variations in the pressure of the borehole.

It has long been established that a knowledge of the pressures prevailing in oil wells is essential for efficient oil-field exploitation, and numerous methods and devices for measuring and recording these pressures have been devised.

These devices usually comprise a chart, movable or rotatable at a constant speed, and a pressure-responsive member carrying a marker in contact with said chart. When the device is lowered into a borehole the marker traces on the chart a graph of the pressures prevailing in the borehole with regard to time.

A serious drawback of most of the devices of the above type now on the market, is, however, a certain lack of accuracy with regard to the data recorded.

It has been found that in many cases this lack of accuracy is largely caused by the relatively high frictional forces involved in the mechanism of transmitting the borehole pressure to which the recording means are subjected. These excessively high frictional forces appear to be due to the fact that the pressure-transmitting members in these gauges either remain stationary through relatively large periods of time during pressure-recording operations, whereby a certain amount of sticking is caused, or move at low speeds and over short distances in response to the relatively slow changes of pressure within the borehole.

Since it is known (see "High Oiliness—Low Wear," by G. L. Neely, S. A. E. Proceedings, meeting of May 4-9, 1937) that the friction force opposing the relative motion of two surfaces with regard to each other is always the greatest at the moment when such motion begins, and that the coefficient of friction decreases, within a certain range, with increasing speeds, it is clear that the friction opposing the pressure-responsive motion of said substantially stationary pressure-transmitting members, which may be called static friction, is greater than the friction, which may be called kinetic friction, that would obtain if said members were in continuous motion with regard to the supporting elements in contact therewith.

It is, therefore, the object of this invention to provide a borehole pressure gauge wherein the elements responsive to the well pressure and indicating or recording the same are maintained in motion, usually a constant motion, of a predetermined value and direction and independent of the action of the well pressure. The effect of the well pressure is to add another motion component or components to the motion of said elements under conditions where the effect of static friction is eliminated.

Accordingly, the invention provides a borehole pressure gauge comprising a piston or plunger movable by the borehole pressure against the action of a resilient member, and rotatable at the same time by a driving mechanism with regard to the annular elements supporting said plunger or piston, whereby the friction force opposing the pressure-responsive displacements of said piston or plunger is minimized or reduced due to the continuous motion of said plunger with regard to said supporting elements.

The complete pressure gauge or bomb of the present invention comprises a casing which may be subdivided into three sections. The top section comprises suspension or attachment means whereby the gauge may be lowered into the borehole at the end of a wire line or tube string, or may be attached to the lower side of a packer in order to determine bottom hole or rat hole pressure, as described in the co-pending application Serial No. 99,172, filed September 2, 1936, by George H. Murray. The top section may also carry means for taking fluid samples from the well, or for making certain measurements independent from the pressure measurements, such, for example, as a maximum thermometer, fusible temperature alloys, etc. The top section, being conventional in its design, is not shown in the drawing.

The bottom section of the pressure gauge comprises a driving mechanism, such as a spring or a clockwork mechanism, adapted to bring about the rotational motion of the pressure-responsive members of the gauge. This mechanism being of conventional design, the lower section is only diagrammatically shown in the drawing.

The middle portion of the pressure gauge comprises the essential elements of the present invention and is shown in the drawing in detail.

The construction of an apparatus forming a preferred embodiment of the present invention will be readily understood from the following description taken in reference to the attached drawing, wherein.

Figure 1:
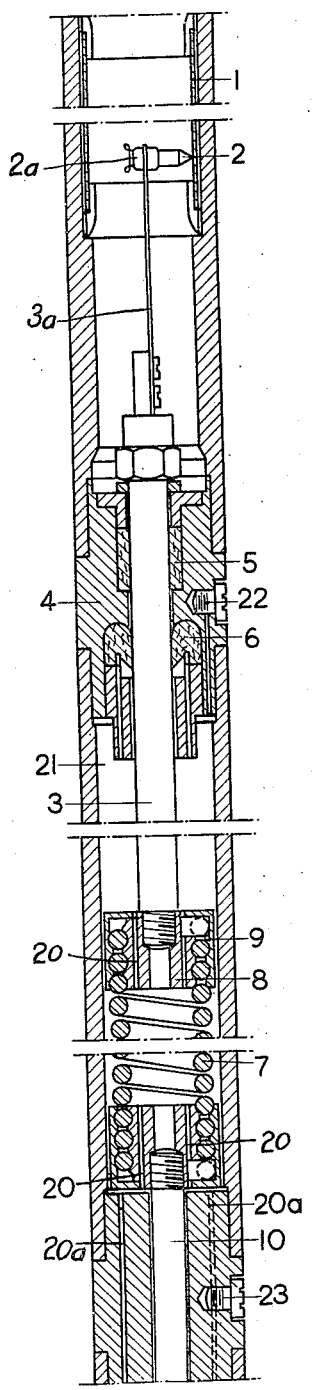
Fig. 1 is a vertical cross-sectional view of the upper portion of the middle section.

Referring to Fig. 1, a chart supported by a chart-carrying member of any suitable form, such, for example, as a fixed drum 1, is shown in contact with suitable motion-registering means, such as a marker, pen, or stylus 2. The marker is affixed by means of a stylus head 2a and rod 3a to the upper end of a polished plunger or piston rod 3, which passes through a stuffing box 4 provided with a packing ring 5 and a packing gland 6. The lower end of plunger 3 is connected with the helical pressure spring 7, being screwed into the spring-suspending screw bolt 8, whereby the spring screw nut 9 is also held in position and the spring 7 is supported between screw bolt 8 and screw nut 9.

Figure 2:
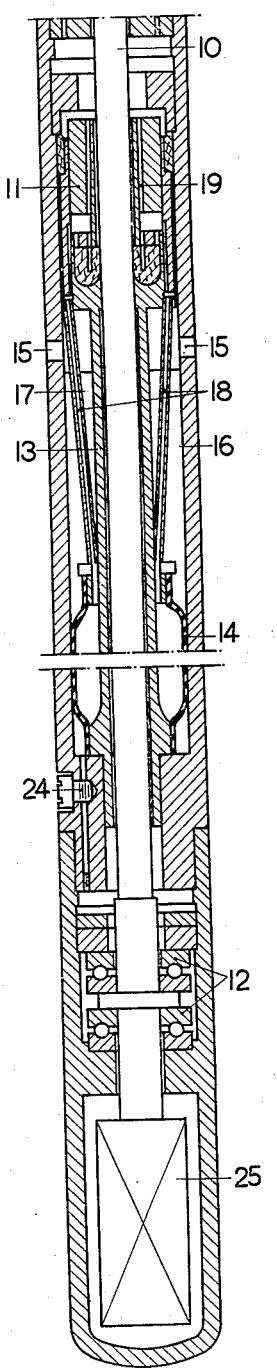
Fig. 2 is a vertical cross-sectional view of a portion of the middle section, adjoining the portion shown in Fig. 1, and the bottom section.

The lower end of the helical spring 7 is fastened in the same manner to the rotating spindle 10, which, as shown in Fig. 2, passes through a stuffing box 11, similar to box 4. The lower end of spindle 10 terminates in a ball-bearing 12, adapted to transmit to the spindle 10 the rotational motion of the driving mechanism 25 located in the bottom section of the pressure gauge, without allowing any motion of said spindle in an axial direction.

The spindle 10 is surrounded by a non-rotating sleeve 13, which carries the stuffing box 11, and a tubular diaphragm or resilient container 14, made of a suitable flexible material, such as rubber, canvas, impregnated silk, etc. This diaphragm is shown in the drawing in inflated form, and separates the well fluid entering the space 16 through the inlet parts 15 from the clean pressure medium, such as a soap solution, glycerin, refined oil, etc., which fills the space inside said diaphragm, the small-diameter tubes 18, the ducts 19, 20, and 20a, and the housing 21 of the helical pressure spring 7.

To protect the ball bearing 12 from excessive end-thrust, the piston rod 3 and the rotating spindle 10 are preferably given the same diameter whereby the axial force acting on the spindle 10 can never be in excess of that acting on piston rod 3.

In operating the device of the present invention, the following procedure may be followed.

A screw-pump, or any similar device, is connected to the valve and pump connection 23, and the spring housing 21, as well as the space inside of the diaphragm 14, which, as stated above, is in fluid communication therewith by means of tubes 18 and ducts 19, 20, and 20a, are completely filled with the pressure medium, any air entrapped therein being released by means of a screw plug 22. The supply of the pressure fluid is discontinued, and the valve and pump connection 23 is closed after a small initial pressure has been built within the system.

The space 16 outside the diaphragm 14 is filled as completely as possible with water or any other suitable liquid, in order to prevent the well fluid from coming into contact with the material of the diaphragm.

It may be noted that any dirt which may enter through the inlet ports 15 may be drained and washed out after completing the pressure recording operations by means of screw plug 24 in the lower end of the gauge casing which serves as a tubular housing for the diaphragm 14.

After inserting a recording chart and winding the driving mechanism, the apparatus is lowered into the borehole at the end of a wire line or of a string of tubing, and may be stopped for a certain period of time, such, for example, as from 3 to 5 minutes at any point where a pressure reading is desired.

The pressure of the borehole fluid entering the gauge casing by means of ports 15 is transmitted to the fluid inside the flexible diaphragm 14, and thence, by means of tubes 18 and ducts 19, 20, and 20a, to the housing 21, wherein an increase in said pressure will cause an axial displacement of the plunger 3 against the resilient or contractile action of the spring 7, whereby the marker 2 is moved axially with regard to the chart 1. Since the fluid pressure on either side of the screw bolt—screw nut arrangement is equalized by means of fluid passages 20 in said arrangement, the effective axial force acting to displace the plunger 3 is a function of the cross-sectional area of said plunger 3. Since these axial displacements are superimposed on a calibrated rotational displacement continuously imparted to the plunger 3 and the marker 2 by means of the driving mechanism in the bottom section of the gauge, the spindle 10, and the spring 7, said continuous rotational motion serving to prevent sticking and to minimize the friction force opposing the axial displacements of plunger 3, while at the same time recording the time element in the graph traced by marker 2, it will be seen that the device of the present invention provides an exceedingly sensitive and reliable device whereby the pressure variations occurring within a borehole may be determined with great accuracy from the record traced by the marker on the chart.

Figure 3:
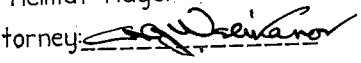
Fig. 3 is a vertical cross-sectional view of a modification of recording means shown in Fig. 1.

It is understood that the present invention is in no way limited to the embodiment described above, but pertains broadly to a pressure gauge wherein the element capable of pressure-responsive motion is also actuated for a continuous motion with regard to a stationary element of the pressure gauge by means of a pressure-independent mechanism, whereby frictional resistance is minimized. Thus, the same result may be achieved in the embodiment described above by attaching the drum 1' to the end of the plunger 3 while rigidly attaching the marker 2' to the inside wall of the pressure gauge, as shown in Fig. 3.

I claim as my invention:

1. A pressure recorder including a container adapted to receive therein a stationary record chart, a marking instrument associated with said chart and mounted for rotary and reciprocating movement thereover, a timing mechanism for continuously rotating the instrument, and means to reciprocate the instrument during the timed rotation thereof, whereby to obtain a horizontal and vertical record on the chart of the movement of the last named means.

2. A recorder including a container adapted to receive a record receiving chart removably mounted in said container, a marking instrument associated with said chart and mounted for reciprocating and rotary movement thereover, timing means carried by the container for rotating the instrument, and means for reciprocating said instrument whereby to record the movement of the reciprocating means upon said chart.

3. In a well pressure gauge comprising a chart carrier and a plunger, means for displacing the plunger with regard to said chart carrier, said means comprising a timing mechanism, a rotating member actuated by said mechanism, a resilient member adapted to transmit the motion of the rotating member to rotate the plunger, and well-pressure-responsive means working against the action of said resilient member for moving said plunger transversely to its plane of rotation, and marker means attached to the plunger to record on a chart supported by said carrier the compound displacement resulting from said rotational and said transverse motion of the plunger.

4. In a well pressure gauge comprising a chart element and a marker element in contact with a chart carried by said chart element, means for displacing one of said elements with regard to the other, said means comprising a timing mechanism for continuously and uniformly rotating one of said elements, and a plunger responsive to well pressures for moving the same element transversely to its plane of rotation, whereby the compound displacement resulting from said rotational and said transverse motion is recorded by the marker element on the chart.

5. In a well-testing device, a casing adapted to receive therein a record chart, a timing mechanism in said casing, a stylus head reciprocable in said casing and rotated by said timing mechanism and in cooperative relation with the chart, a stylus carried by said head for engagement with the chart, a fluid pressure actuated mechanism, connecting means between said fluid pressure actuated mechanism and said head, whereby a linear movement is imparted to said head during the rotation of said timing mechanism whereby the stylus will record a graph on the chart.

6. In a well-testing device, a casing adapted to receive therein a record chart, a timing mechanism in said casing, a stylus head reciprocable in said casing, and rotated by said timing mechanism and in cooperative relation with the chart, a stylus carried by said head for engagement with the chart, a spring retracted rod carrying said head, and a fluid pressure actuated mechanism adapted to reciprocate said rod in opposition to its spring during the rotation of said timing mechanism, whereby the stylus will record a graph on the chart of the movement of said rod.

HELMUT HÜGEL.